(12) United States Patent
Kim et al.

(10) Patent No.: US 8,676,272 B2
(45) Date of Patent: Mar. 18, 2014

(54) MOBILE TERMINAL AND METHOD OF CONTROLLING OPERATION OF THE MOBILE TERMINAL

(75) Inventors: Mi Ok Kim, Seoul (KR); Mee Kyung Ryu, Seoul (KR); Han Sol Huh, Seoul (KR); Hyang Sook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/572,864

(22) Filed: Aug. 13, 2012

(65) Prior Publication Data
US 2012/0309460 A1    Dec. 6, 2012

Related U.S. Application Data

(63) Continuation of application No. 12/247,662, filed on Oct. 8, 2008, now Pat. No. 8,271,046.

(30) Foreign Application Priority Data

Oct. 9, 2007    (KR) .................. 10-2007-0101604

(51) Int. Cl.
*H04M 1/00*    (2006.01)
*H04B 1/38*    (2006.01)
*H04L 12/58*    (2006.01)
*H04M 1/725*    (2006.01)
*H04M 1/663*    (2006.01)

(52) U.S. Cl.
USPC ............ 455/566; 455/412.1; 455/412.2

(58) Field of Classification Search
USPC ............ 455/566, 412.2, 412.1, 466, 550.1, 455/556.2, 418, 419, 420, 413, 414.1
See application file for complete search history.

(56) References Cited

U.S. PATENT DOCUMENTS

| 7,429,989 B2* | 9/2008 | Kang et al. ............ 345/473 |
| 7,697,960 B2 | 4/2010 | Seo et al. |
| 2001/0046853 A1 | 11/2001 | Aoyama et al. |
| 2005/0261031 A1 | 11/2005 | Seo et al. |
| 2007/0123204 A1 | 5/2007 | Inukai |

FOREIGN PATENT DOCUMENTS

| JP | 11-18145 A | 1/1999 |
| JP | 2001-309074 A | 11/2001 |
| JP | 2001-339469 A | 12/2001 |
| JP | 2003-248841 A | 9/2003 |
| JP | 2005-72958 A | 3/2005 |
| JP | 2005-78427 A | 3/2005 |
| JP | 2007-74652 A | 3/2007 |
| JP | 2007-129609 A | 5/2007 |

* cited by examiner

*Primary Examiner* — Eugene Yun
(74) *Attorney, Agent, or Firm* — Birch, Stewart, Kolasch & Birch, LLP

(57) ABSTRACT

A method of controlling an operation of a mobile terminal having a display screen, and which includes displaying a plurality of avatar images on the display screen, wherein at least a first avatar image represents a first party registered in a phone book of the mobile phone; detecting, via a controller of the mobile terminal, an occurrence of the communication event associated with the first avatar image, the first avatar image having a first shape indicating a first action; and changing the first shape of the first avatar image into a second shape indicating a second action of the first avatar image to inform a user of the mobile terminal about the detected occurrence of the communication event.

20 Claims, 15 Drawing Sheets

MOBILE TERMINAL AND METHOD OF CONTROLLING OPERATION OF THE MOBILE TERMINAL

CROSS-REFERENCE TO RELATED APPLICATION

This application is a Continuation of U.S. application Ser. No. 12/247,662, filed on Oct. 8, 2008 now U.S. Pat. No. 8,271,046, which claims the priority benefit of Korean Application No. 10-2007-0101604, filed on Oct. 9, 2007 in the Korean Intellectual Property Office, the entire contents of which is incorporated herein by reference.

BACKGROUND OF THE INVENTION

1. Field of the Invention

The present invention relates to a mobile terminal, which can display various avatar images on an idle screen in connection with a communication event such as making/receiving a call or sending/receiving a message, and a corresponding method and computer program product for controlling the operation of the mobile terminal.

2. Description of the Related Art

Mobile terminals are portable devices that can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless Internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD) or a full touch screen has steadily grown due to a growing tendency of considering mobile terminals as personal items that can represent users' personality.

Conventionally, users are required to manually choose a menu in order to examine a statement regarding a number of communication events such as making/receiving calls or sending/receiving messages. The statement generally shows a list of incoming/outgoing calls or a list of received/sent messages in order of occurrence. Therefore, users may not be able to visibly recognize to/from whom and how often they have made/received calls or have sent/received messages.

SUMMARY OF THE INVENTION

The present invention provides a mobile terminal that enables a user to visibly recognize various information regarding a communication event (such as making/receiving a call or sending/receiving a message from an idle screen) with ease, and a method and computer program product for controlling the operation of the mobile terminal.

According to an aspect of the present invention, there is provided a method of controlling the operation of a mobile terminal, the method including displaying an idle screen; if a communication event occurs, displaying an avatar image corresponding to a party of the communication event on the idle screen, the communication event including making or receiving a call and sending or receiving a call; and modifying the avatar image according to the amount of occurrence of the communication event.

According to another aspect of the present invention, there is provided a mobile terminal including a display module configured to display an idle screen; and a controller configured to display an avatar image corresponding to a party of a communication event on the idle screen upon the occurrence of the communication event and to modify the avatar image according to the amount of occurrence of the communication event, the communication event including making or receiving a call and sending or receiving a call.

According to another aspect of the present invention, there is provided a computer-readable recording medium having recorded thereon a computer program for executing a method of controlling the operation of a mobile terminal, the method including displaying an idle screen; if a communication event occurs, displaying an avatar image corresponding to a party of the communication event on the idle screen, the communication event including making or receiving a call and sending or receiving a call; and modifying the avatar image according to the amount of occurrence of the communication event.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop book computer, a digital broadcast receiver, a personal digital assistant (PDA), a portable multimedia player (PMP), or a navigation device (handheld or configured for use within an automobile, boat, airplane or other vehicle).

Figure 1:
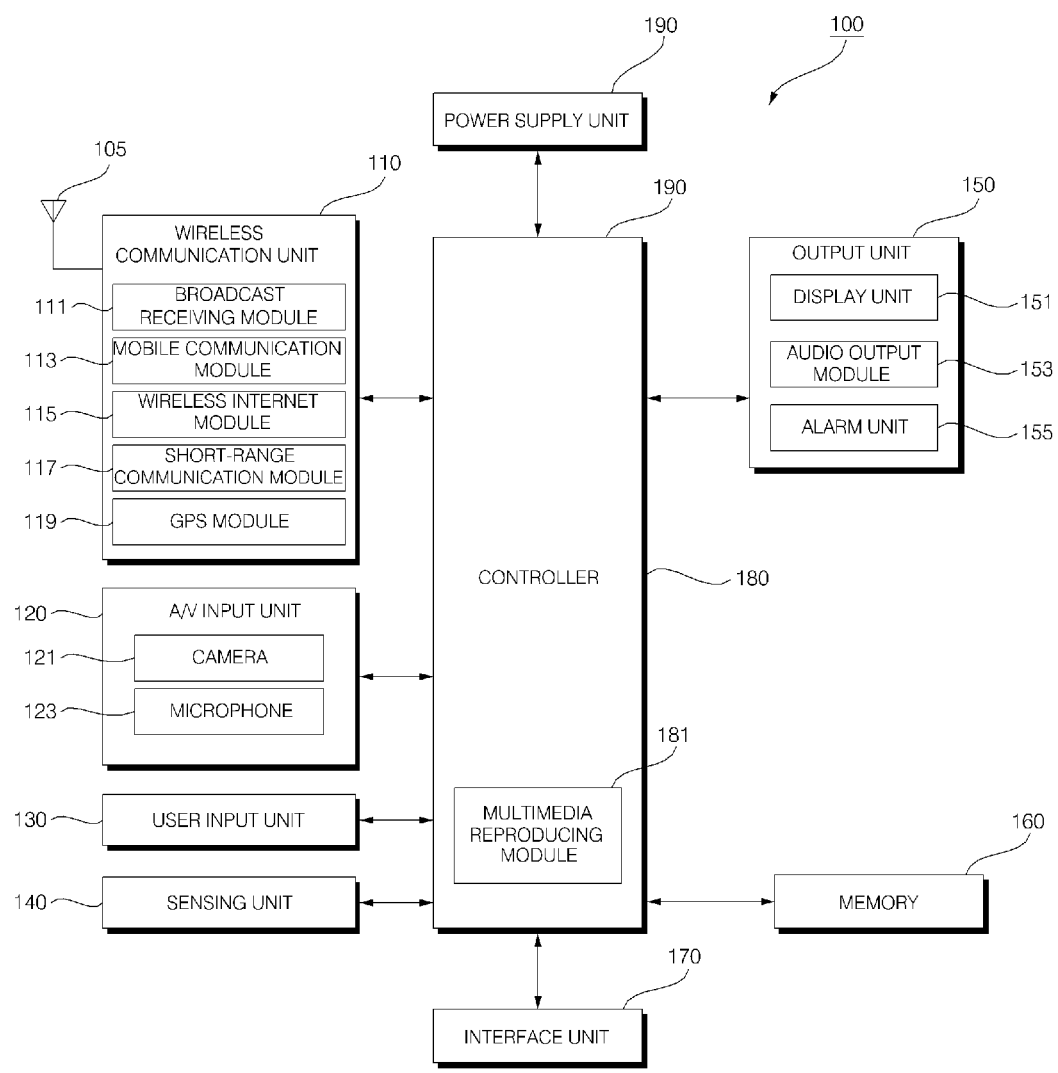
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a manipulation unit 130, a sensing unit 140, an output unit 150, a memory 160, an interface unit 170, a controller 180, and a power supply unit 190. Two or more of the wireless communication unit 110, the A/V input unit 120, the manipulation unit 130, the sensing unit 140, the output unit 150, the memory 160, the interface unit 170, the controller 180, and the power supply unit 190 may be incorporated into a single unit, or some of the wireless communication unit 110, the A/V input unit 120, the manipulation unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless Internet module 115, a short-range communication module 117, and a global positioning system (GPS) module 119.

The broadcast reception module 111 receives a broadcast signal and/or broadcast-related information from an external broadcast management server through a broadcast channel. Examples of the broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of the broadcast-related information include broadcast channel information, broadcast program information and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms, for example, electronic program guide (EPG) of digital multimedia broadcasting (DMB) or electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein.

The broadcast signal and/or the broadcast-related information received by the broadcast reception module 1110 may be stored in the memory 160.

The mobile communication module 113 transmits wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless Internet module 115 may be a module for wirelessly accessing the Internet. The wireless Internet module 115 may be embedded in the mobile terminal 100 or may be installed in an external device.

The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

The A/V input unit 120 may be used to receive audio signals or video signals. The A/V input unit 120 may include a camera module 121 and a microphone module 123. The camera module 121 processes various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted outside the mobile terminal 100 through the wireless communication unit 110. The mobile terminal 100 may include two or more camera modules 121.

The microphone module 123 receives external sound signals during a call mode, a recording mode, or a voice recognition mode with the use of a microphone and converts the sound signals into electrical sound data. In the call mode, the mobile communication module 1130 may convert the electrical sound data into data that can be readily transmitted to a mobile communication base station and then output the data obtained by the conversion. The microphone module 123 may use various noise removal algorithms to remove noise that may be generated during the reception of external sound signals.

The manipulation unit 130 generates key input data based on user input for controlling the operation of the mobile terminal 100. The manipulation unit 130 may be implemented as a keypad, a dome switch, a touch pad (either static pressure or constant electricity), a jog wheel, or a jog switch. In particular, if the manipulation unit 130 is implemented as a touch pad and forms a mutual layer structure along with the display module 151, the manipulation unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The output unit 150 may output audio signals, video signals and alarm signals. The output unit 150 may include the display module 151, an audio output module 153, and an alarm module 155.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

As described above, if the display module 151 and the manipulation unit 130 form a mutual layer structure and are thus implemented as a touch screen, the display module 151 may be used not only as an output device but also as an input device. The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151.

For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. The alarm module 155 may output vibration upon receiving a call signal or a message. In addition, the alarm module 155 may receive a key signal and may output vibration as feedback to the key signal. Once vibration is output by the alarm module 155, the user may recognize that an event has occurred. A signal for notifying the user of the occurrence of an event may be output by the display module 151 or the audio output module 153.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the Internet.

The interface unit 170 may interface with an external device that can be connected to the mobile terminal 100. The interface unit 170 may be a wired/wireless headset, an external battery charger, a wired/wireless data port, a card socket for, for example, a memory card) or a subscriber identification module (SIM)/user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 is supplied with power by an external power source or an internal power source and supplies power to other components in the mobile terminal 100.

The mobile terminal 100 may include a wired/wireless communication system and a satellite-based communication system. The mobile terminal 100 may be configured to be able to operate in a communication system transmitting data as frames or packets.

The exterior of the mobile terminal 100 will hereinafter be described in detail with reference to FIGS. 2 and 3. For convenience, assume that the mobile terminal 100 is a slider-type mobile phone. However, the present invention is not restricted to a slider-type mobile phone. Rather, the present invention can be applied to various mobile phones, other than a slider-type mobile phone.

Figure 2:
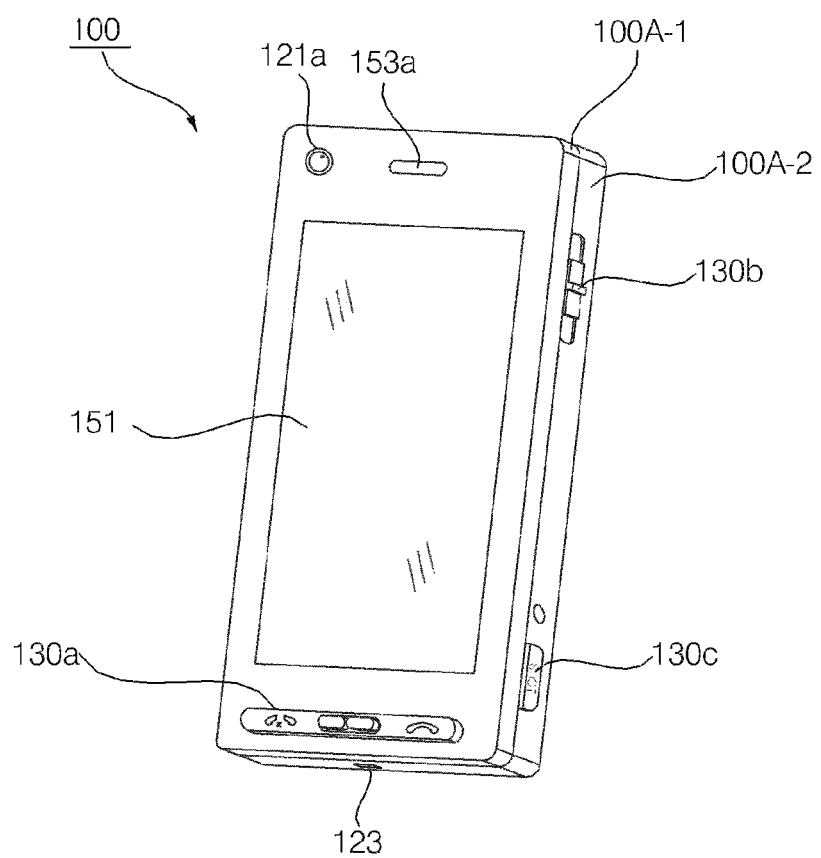
FIG. 2 illustrates a front perspective view of the mobile terminal shown in FIG. 1.

FIG. 2 illustrates a front perspective view of the mobile terminal 100 shown in FIG. 1. Referring to FIG. 2, the mobile terminal 100 may include a front case 100A-1 and a rear case 100A-2, which form the exterior of the first body 100A. Various electronic products may be installed in the empty space between the front case 100A-1 and the rear case 100A-2. At least one intermediate case may be additionally disposed between the front case 100A-1 and the rear case 100A-2.

The front case 100A-1 and the rear case 100A-2 may be formed of a synthetic resin through injection molding. Alternatively, the front case 100A-1 and the rear case 100A-2 may be formed of a metal such as stainless steel (STS) or titanium (Ti).

The display module 151, a first audio module 153a, a first camera 121a and a first manipulation module 130a may be disposed in the main body of the mobile terminal 100, and particularly, in the front case 100A-1. A second manipulation module 130b, a third manipulation module 130 and the microphone module 123 may be disposed on a lateral side of the rear case 100A-2.

The display module 151 may include an LCD or an OLED, which visually represents information.

Since a touch pad is configured to overlap the display module 151 and thus to realize a layer structure, the display module 151 may serve as a touch screen. Thus, it is possible for a user to input information to the display module 151 simply by touching the display module 151.

The first audio module 153a may be implemented as a receiver or a speaker. The first camera 121a may be configured to capture a still image or a moving image of a user. The microphone module 123 may be designed so as to be able to effectively receive the voice of a user or other sounds.

The first through third manipulation modules 130a through 130c may be collectively referred to as the manipulation unit 130. The manipulation unit 130 may adopt various manipulation methods as long as it can offer tactile feedback to a user.

For example, the manipulation unit 130 may be implemented as a dome switch or a touch pad which receives a command or information upon being pushed or touched by a user. Alternatively, the manipulation unit 130 may be implemented as a wheel, a jog dial, or a joystick.

The first manipulation module 130a may allow a user to input such commands as 'start', 'end', and 'scroll'. The second manipulation module 130b may allow a user to choose an operating mode. The third manipulation module 130c may serve as a hot key for activating certain functions of the mobile terminal 100.

Figure 3:
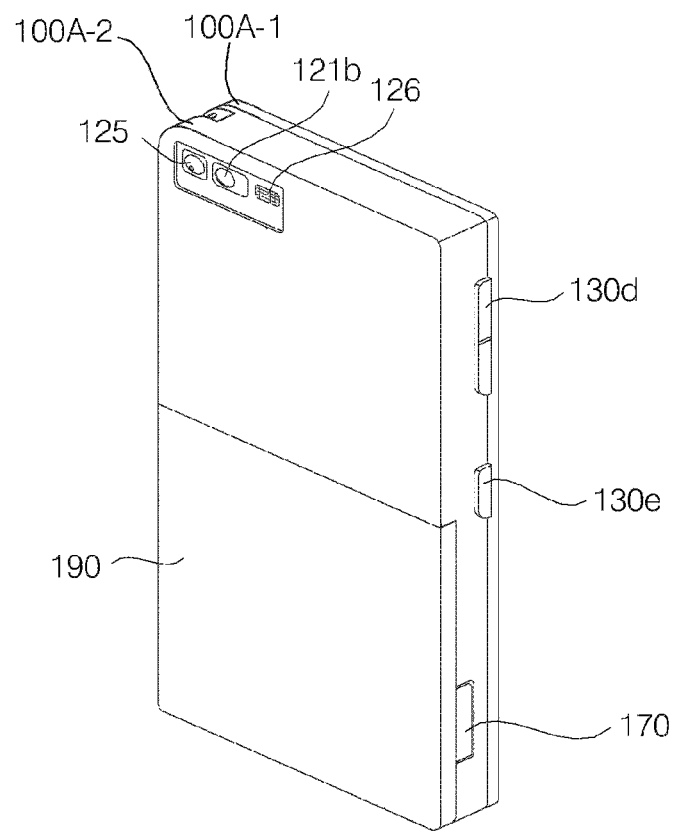
FIG. 3 illustrates a rear perspective view of the mobile terminal shown in FIG. 1.

FIG. 3 illustrates a rear perspective view of the mobile terminal 100 shown in FIG. 2. Referring to FIG. 3, a fourth manipulation module 130d, a fifth manipulation module 130e, and the interface unit 170 may be disposed on a lateral side of the rear case 100A-2, and a second camera 121b may be disposed at the rear of the rear case 100A-2.

The second camera 121b may have a different photographing direction from that of the first camera 121a shown in FIG.

2. In addition, the number of pixels of the second camera 121*b* may be different from the number of pixels of the first camera 121*a*.

For example, the first camera 121*a* may be used to capture an image of the face of a user and then readily transmit the captured image during a video call. Thus, a low-pixel camera module may be used as the first camera 121*a*. The second camera 121*b* may be used to capture an image of an ordinary subject. Given that images captured by the second camera 121*b* generally do not need to be transmitted, a high-pixel camera module may be used as the second camera 121*b*.

A camera flash 125 and a mirror 126 may be disposed near the second camera 121*b*. The camera flash 125 illuminates a subject when the second camera 121*b* captures an image of the subject. The user may look in the mirror 126 for taking a self shot.

A second sound output module (not shown) may be additionally provided in the rear case 100A-2. The second sound output module may realize a stereo function along with the first audio output module 153*a*. The second sound output module may also be used during a speaker-phone mode.

An antenna (not shown) for receiving a broadcast signal may be disposed on one side of the rear case 100A-2. The antenna may be installed so as to be able to be pulled out from the second body 100B-2.

The interface unit 170 may serve as a path for allowing the mobile terminal 100 to exchange data with an external device. For example, the interface unit 170 may be a connection terminal for connecting an earphone to the mobile terminal 100 in a wired or wireless manner, a port for short-range communication or a power supply terminal for supplying power to the mobile terminal 100. The interface unit 170 may be a subscriber identification module (SIM) or a user identification module (UIM) or may be a card socket for an exterior-type card such as a memory card for storing data.

The power supply unit 190 may be inserted in the rear case 100A-2. The power supply unit 190 may be a rechargeable battery and may be coupled to the rear case 100A-2 so as to be able to be attached to or detached from the rear case 100A-2.

The second camera 121*b* is illustrated in FIG. 3 as being disposed in the rear case 100A-2, but the present invention is not restricted to this. The first camera 121*a* may be able to rotate and thus to cover the photographing direction of the second camera 121*a*. In this case, the second camera 121*b* may be optional.

Figure 4A:
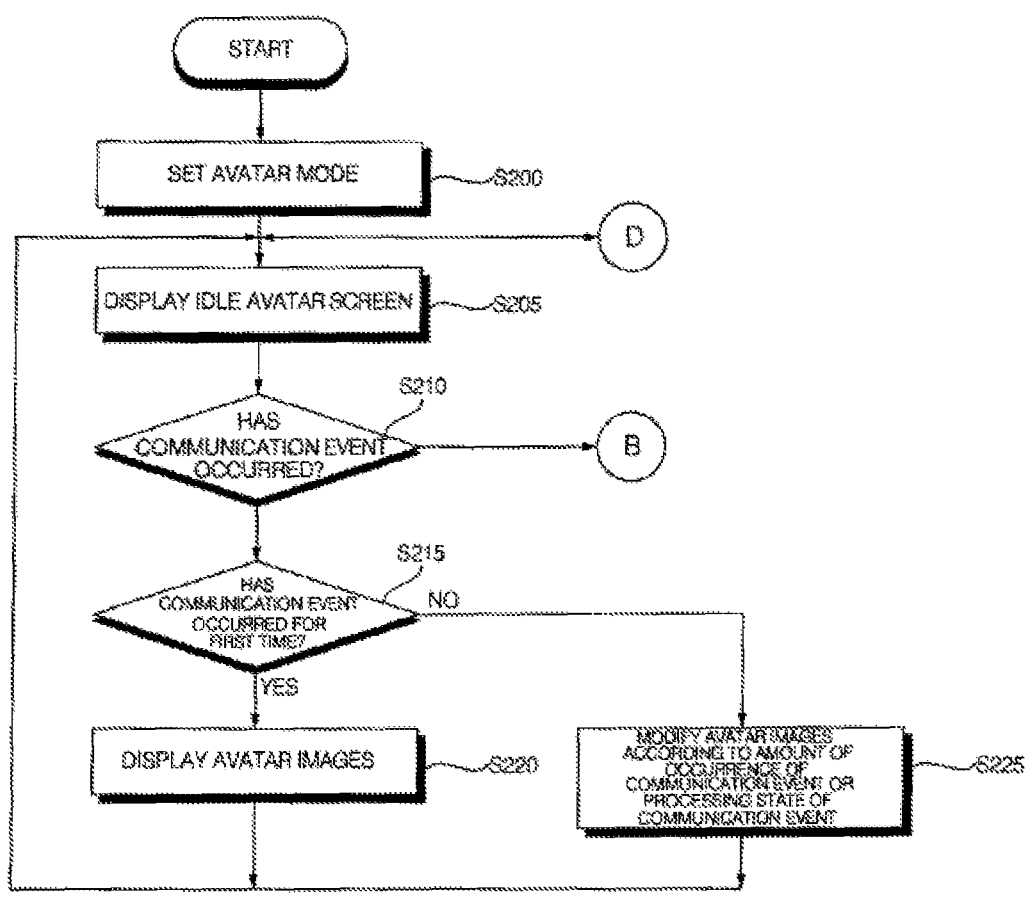
FIGS. 4A through 4C illustrate flowcharts of a method of controlling the operation of a mobile terminal according to an exemplary embodiment of the present invention.
Figure 4B:
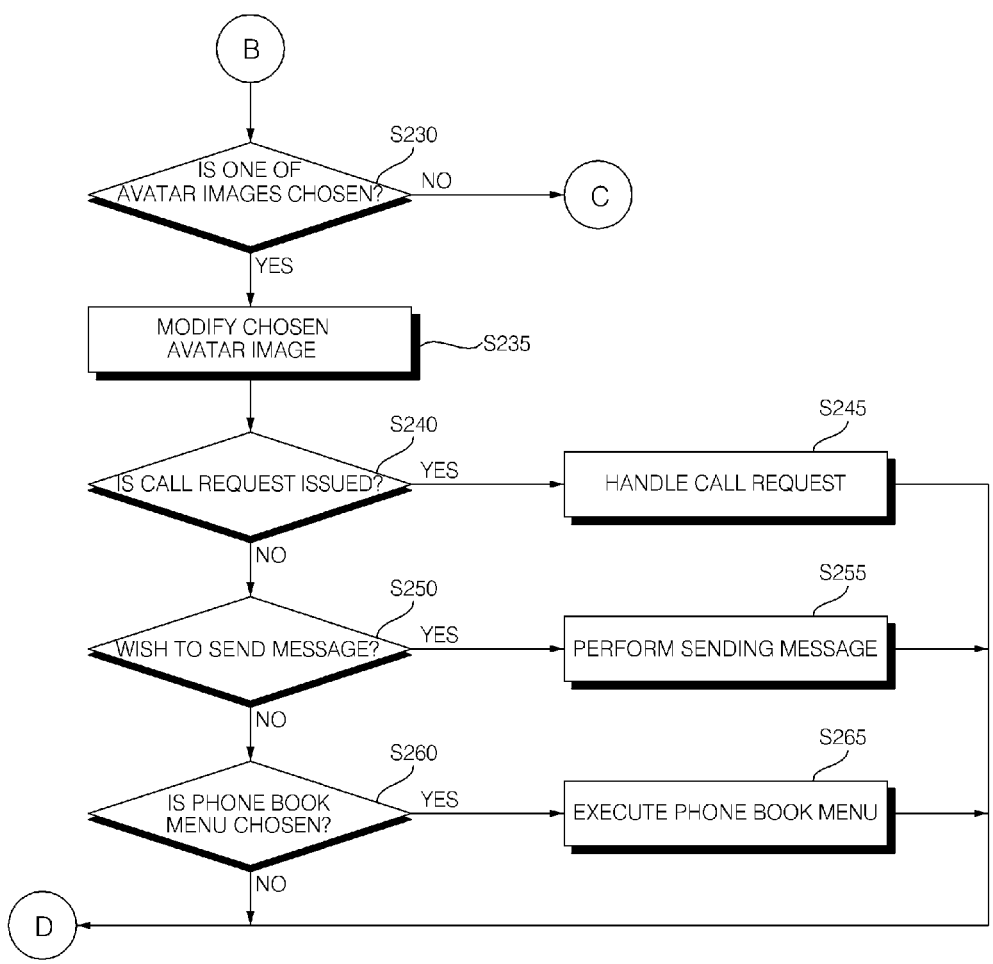
Figure 4C:
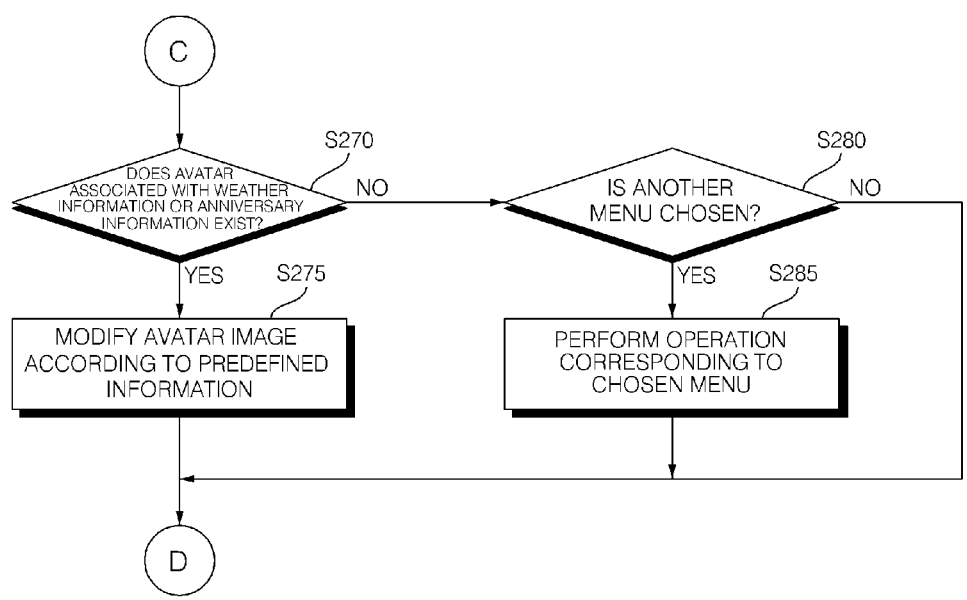

FIGS. 4A through 4C illustrate flowcharts of a method of controlling the operation of a mobile terminal according to an exemplary embodiment of the present invention. Referring to FIG. 4A, if a user uses a menu to set an avatar mode for decorating an idle screen (S200), the mobile terminal 100 may be placed in the avatar mode, and then, the controller 180 may control an idle avatar screen to be displayed on the screen of the display module 151 (S205).

When a communication event such as making/receiving a call or sending/receiving a message occurs, a number of avatar images respectively corresponding to the parties of the communication event (such as a caller and a callee or a sender and a receiver) are displayed on the idle screen. The avatar images may be modified according to a characteristic of the communication event, such as a total number of occurrences of the communication event per day or per other unit time. The avatar images may also be modified according to a priority of the communication event (e.g., a priority embedded in a text message or other message body or header), a type of the communication event, a time of the communication event, a date of the communication event, or another characteristic of the communication event.

If a communication event such as making/receiving a call or sending/receiving a message occurs (S210), it may be determined whether the communication event has occurred for the first time (S215). If the communication event is determined to have occurred for the first time, a number of new avatar images respectively corresponding to the parties of the communication event may be displayed on the idle avatar screen (S220). On the other hand, if the communication event is determined not to have occurred for the first time, a number of existing avatar images displayed on the idle avatar screen may be appropriately modified according to the amount of occurrence of the communication event or the processing state of the communication event (S225).

Referring to FIG. 4B, if the user touches and thus chooses one of the avatar images displayed by the display module 151 (e.g., a touch screen) (S230), the chosen avatar image may be displayed differently from the other avatar images so as to be able to be easily recognized (S235). For example, the chosen avatar image, unlike the other avatar images, may include an avatar raising his/her hand.

Thereafter, if the user issues a call request (S240), the controller 180 may control the mobile communication module 113 to execute a call-making mode and thus to make a call to a phone number corresponding to the chosen avatar image (S245). If the user chooses to send a message to a person corresponding to the chosen avatar image (S250), the controller 180 may execute a message transmission mode and may thus enable a message written by the user to be sent to the phone number corresponding to the chosen avatar image (S255). On the other hand, if the user chooses a phone book (S260), the controller 180 may execute a phone book mode and may thus enable the user to register information in a phone number list including a number of phone numbers associated with the chosen avatar image to be displayed or to emit the phone number list (S265).

Referring to FIG. 4C, if weather information or anniversary (e.g., birthday, wedding anniversary, date of first meeting, etc) information is registered in a phone book in connection with a corresponding one of the avatar images displayed by the display module 151, a corresponding avatar image may be appropriately modified in accordance with a change in the weather or on an anniversary (S275).

If the user chooses another menu (S280), an operation corresponding to the chosen menu may be performed (S285). Thereafter, the method returns to operation S205.

In this manner, it is possible to visibly recognize with whom and how often the user has involved communication by displaying a number of avatar images respectively corresponding to the parties of a communication event such as making/receiving a call or sending/receiving a message and modifying the avatar images according to the amount of occurrence of the communication event.

FIGS. 5 through 9 illustrate diagrams of various screen images displayed by the display module 151 of the mobile terminal 100 shown in FIG. 1 and explain the method shown in FIGS. 4A through 4C.

Figure 5:
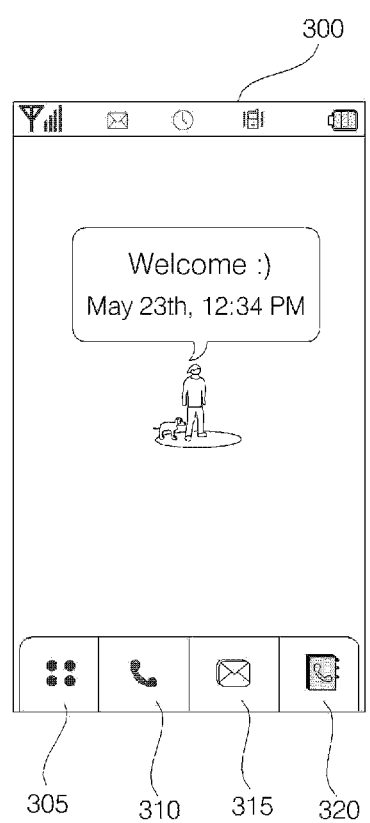
FIGS. 5 through 13 illustrate diagrams of various screen images displayed by the mobile terminal shown in FIG. 1 and explain the method shown in FIGS. 4A through 4C.
Figure 6:
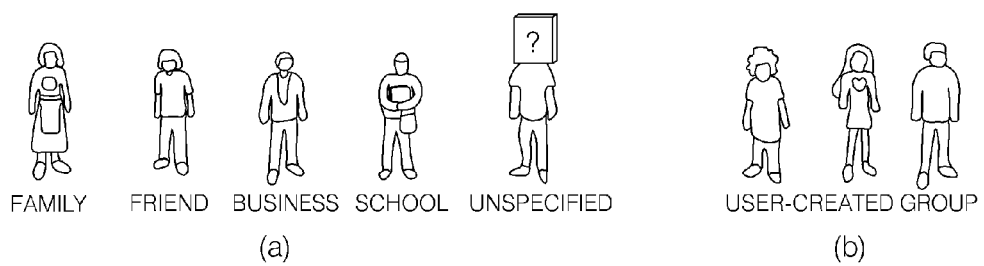

More specifically, FIG. 5 illustrates a diagram of an idle avatar screen 300 displayed when an avatar mode is set. Referring to FIG. 5, if an avatar mode is chosen from a menu for decorating an idle screen, the idle avatar screen 300 may be displayed. If a communication event such as making/receiving a call or sending/receiving a message occurs, a number of avatar images respectively corresponding to the parties of the communication event may be displayed on the idle avatar screen 300, and the avatar images may be appropriately modified according to the amount of occurrence of the communication event within a certain period of time. In this manner, it is possible to display a history of communication events that occur each day. The interval of initializing the avatar images may be altered according to the environment of the use of the mobile terminal 100.

In the case of displaying a history of communication events that occur each day, the avatar images may be initialized at midnight or at the time when a user goes to bed. The user may choose one of the avatar images displayed on the idle avatar screen 300 and may make a call to a person corresponding to the chosen avatar image by using a call menu. In addition, the user may send a message to the person corresponding to the chosen avatar image or may execute a phone book menu. The call or message may be sent upon the user's touching the avatar in a predetermined fashion, or by a multi-step process of selecting the avatar by touch and then selecting the call or message function by touch. The predetermined fashion may be a quick touch, a long touch, a double touch or some other touch type. The touches may be made with a finger, stylus or other device. In addition to touches, the avatar and other functions may be selected with a mouse, jog wheel or other display screen manipulation device or component. Operations may also be initiated and terminated through a menu or hot key.

If a communication event is yet to occur, the idle avatar screen 300 may be displayed. In this case, an avatar representing the user, date information, time information and a simple daily message may be displayed on the idle avatar screen 300. An icon 305 for choosing other menus, an icon 310 for making a call, an icon 315 for choosing a message menu, and an icon 320 for choosing a phone book menu may be displayed at the bottom of the idle avatar screen 300.

Referring to FIG. 6(a), different avatars may be designated for different groups registered in a phone book such as a family group, a friend group, a coworker group, a schoolmate group, and an unspecified group. In addition, referring to FIG. 6(b), a user may create a new avatar and may designate the new avatar for each group registered in a phone book. Whenever a new phone number is registered in a phone book, an avatar image may be automatically designated for the new phone number according to group information of the new phone number.

Figure 7:
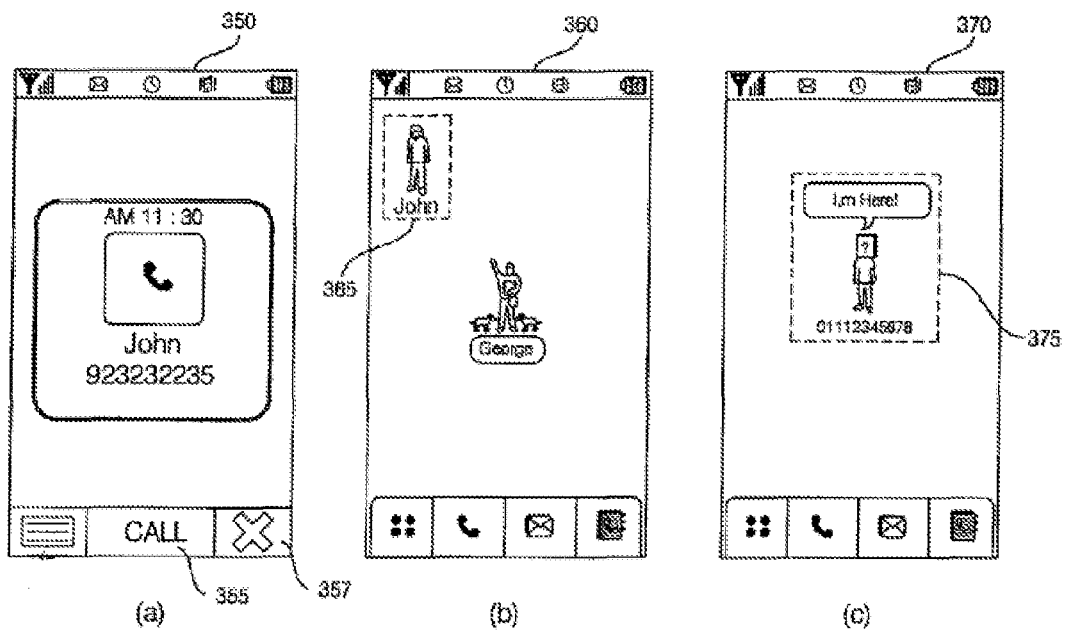

FIG. 7 illustrates diagrams of various screen images displayed when a call is received. Referring to FIG. 7(a), if an incoming call is received when an idle avatar screen is displayed, a screen image 350 is displayed. If a user chooses an icon 'call' 355, the user may answer the incoming call. In this case, an avatar image corresponding to a caller may be displayed on the idle avatar screen. More specifically, referring to FIG. 7(b), if the caller's phone number is registered in a phone book, an avatar image 365 including the caller's name and an avatar representing a group including the caller may be displayed on the idle avatar screen. On the other hand, referring to FIG. 7(c), if the caller's phone number is yet to be registered in the phone book, an avatar image 375 including the caller's phone number and an avatar representing an unspecified group may be displayed on the idle avatar screen. The user can select an icon 357 to reject the incoming call.

If a user makes a call to or receives a call from the same caller more than one time, an avatar image including an avatar representing the caller and a number of dogs corresponding to the number of calls made to or received from the caller may be displayed. Alternatively, an avatar image including a bigger avatar than other avatars may be displayed. Alternatively, the avatar may be able to perform different tasks (e.g., wave, jump, spin) depending on the number of calls received. Alternatively, the avatar may appear to operate differently depending on time of day or season. That is, an avatar may yawn in early hours or may where a coat in winter. Alternatively, the initial avatar may be a real or imaginary animal that evolves into different forms as the number of calls increases. Alternatively, the avatar may be a character of a game that may obtain greater powers, capabilities or devices as the number of calls increases. The avatar may be imported from or exported (wirelessly or via a wired connection) to a game device and/or personal computer. Alternatively, the avatar may be related to a game that is played on the mobile terminal. Upon import/export the avatar may also obtain characteristics that are visible or usable in the mobile terminal or the game device. If the avatar is related to a game, the game may be playable on the mobile terminal.

The avatar may be represented as digital information that is encapsulated in a call, text message or other communication. Thus, the avatar may be sent to another party when that party is first contacted or when that party has lost or deleted the avatar. Conversely, new avatars may be received from incoming calls or from a connection to another device. The ability to accept a new avatar may be controlled via pop-up confirmation windows or other confirmation techniques. Avatars received from external devices may be subject to a virus scan or other scan to ensure safety or compatibility with the receiving mobile terminal.

The user of the mobile terminal may or may not be prohibited from editing or modifying the appearance or characteristics of the avatar. Thus, the avatar may be locked or unlocked. A locked avatar may be permanently locked or may be unlocked with a password. Any and all manipulations of the avatar may be accomplished through a menu, a hot key and/or a pop-up window that is initiated by a predetermined interaction with the displayed avatar and/or by moving a cursor over the avatar.

The avatar may be configured to perform an action besides mere movement or evolution. For example, the avatar may be configured to open a menu or to show a movie. These functions may be initiated by receipt of a call from a person/number associated with the avatar, or in response to another stimuli such a time of day, a day of year, or another action performed on the mobile terminal. For example, if the user of the mobile terminal acts to delete an avatar, the avatar can be shown to beg for mercy or to ask for another chance.

The user of the mobile terminal may elect to send his/her avatar, or updates to the avatar, with an outgoing call or message via a menu, pop-up prompt screen or another method. If the avatar is embedded in an incoming or outgoing message, the avatar may be encrypted or may be encoded with a time-to-live so that the avatar persists within a device for a predetermined or user determined time period.

Figure 8:
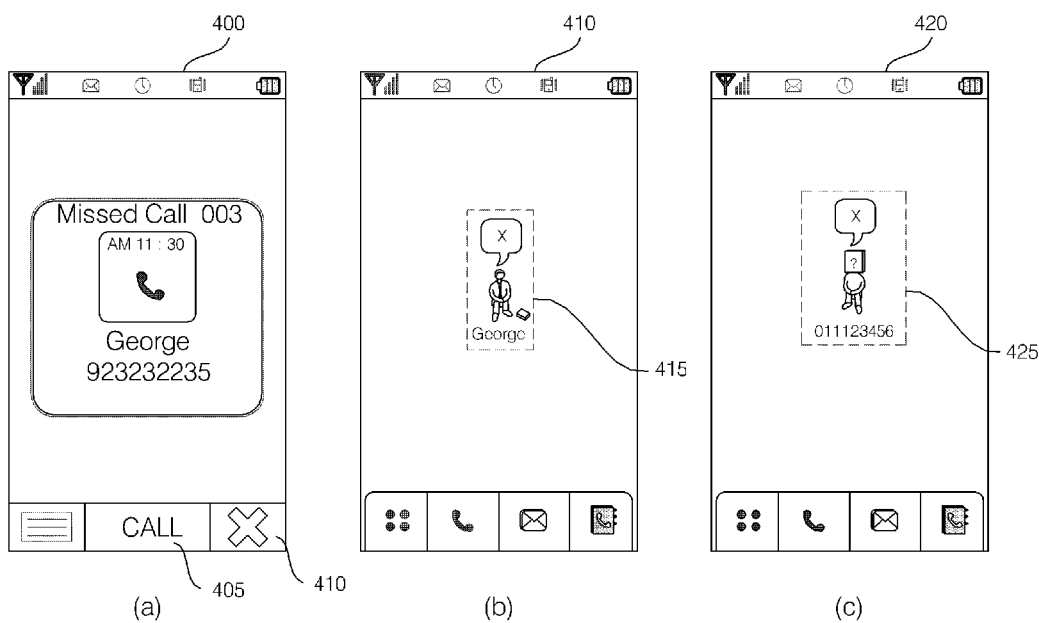

FIG. 8 illustrates diagrams of various screen images displayed when there is a missed call. Referring to FIG. 8(a), if there is a missed call, a screen image 400 may be displayed. If a user chooses an icon 'X' 410 at the bottom of the screen image 400, an avatar image including an avatar representing a caller of the missed call may be displayed on the screen of the display module 151. The user can call back the missed call by selecting the call icon 405.

More specifically, referring to FIG. 8(b), if the caller's phone number is registered in a phone book, an avatar image 415 including an avatar representing a group including the caller, the caller's name, and a mark 'X' indicating that there is a missed call may be displayed. On the other hand, if the caller's phone number is yet to be registered in a phone book, an avatar image 425 including an avatar representing an unspecified group, the caller's phone number, and the mark 'X' may be displayed.

Referring to FIGS. 8(b) and 8(c), an avatar representing a missed call may be displayed as sitting down. If there is more than one missed call, call information regarding the most recently missed call may be displayed.

In this manner, a user may easily recognize whether there is a missed call based on an avatar image displayed by the mobile terminal 100. In addition, the user may issue a call request or send a message simply by choosing an avatar image corresponding to the caller of a missed call.

Figure 9:
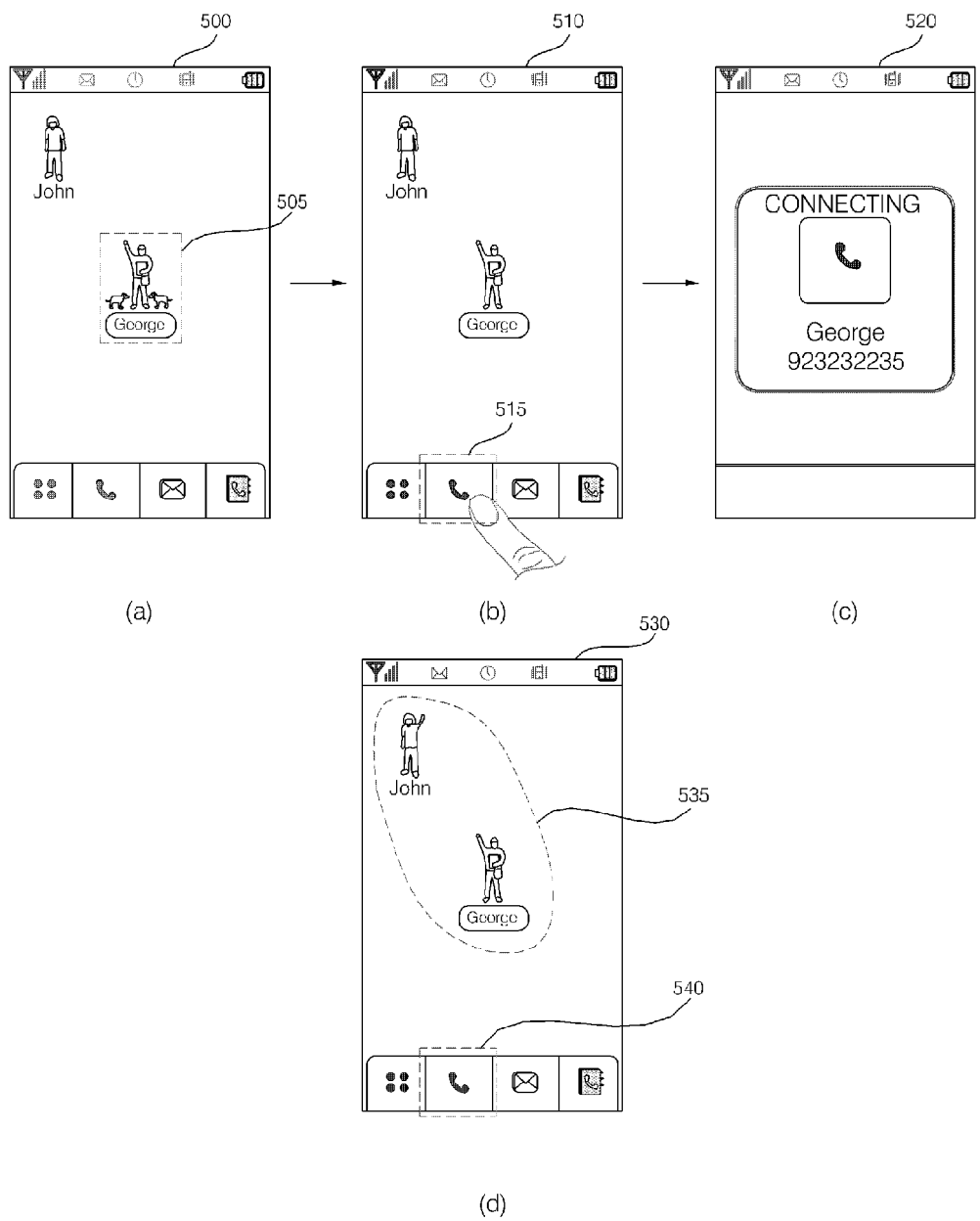

FIG. 9 illustrates diagrams for explaining how to issue a call request when an idle avatar screen is displayed. If a user touches and thus chooses an avatar image 505 and then touches an icon 'call' 515, as illustrated in FIGS. 9(a) and 9(b), a request for making a call to a person corresponding to the chosen avatar image 505 may be issued, as illustrated in FIG. 9(c). Referring to FIG. 9(d), if the user chooses more than one avatar image 535 displayed on an idle avatar screen and touches an icon 'call' 540 when a screen image 530 is displayed, a conference call may be performed.

An avatar image including an avatar and a number of dogs corresponding to the amount of occurrence of a communication event may be displayed.

Figure 10:
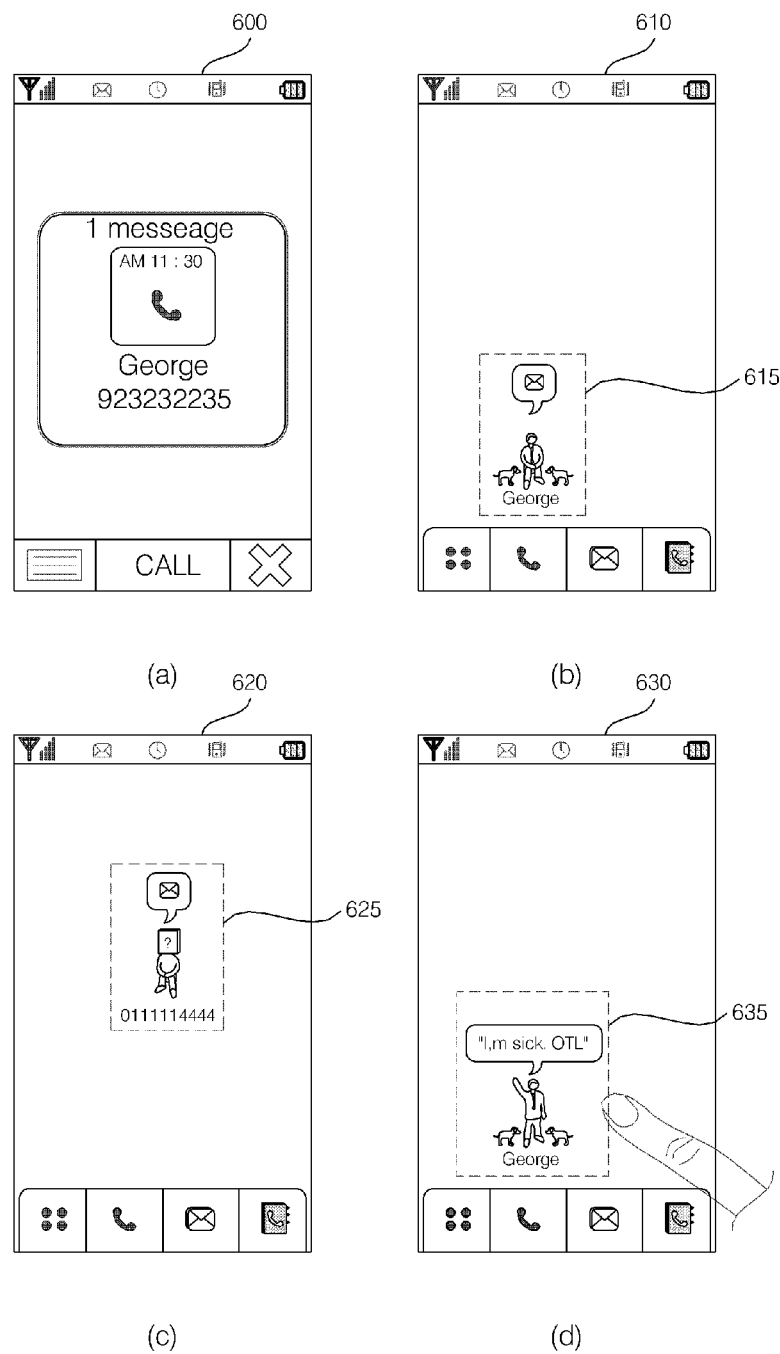

FIG. 10 illustrates diagrams for explaining how to send a message when an idle avatar screen is displayed. Referring to FIG. 10(a), a screen image 600 indicating that there is a new message may be displayed. Referring to FIG. 10(b), if a phone number corresponding to the new message is registered in a phone book, an avatar image 615 including an avatar representing a group including a sender of the new message, the sender's name and a message icon may be displayed. On the other hand, if the sender's phone number is yet to be registered in the phone book, an avatar image 625 including an avatar representing an unspecified group, the message icon and the sender's phone number may be displayed.

Referring to FIGS. 10(b) and 10(c), if the new message is yet to be read by a user, the avatar in the avatar image corresponding to the sender may be displayed as sitting down. If the user chooses the avatar representing the sender, the posture of the avatar in the avatar image may be changed, and the content of the new message may be displayed, as indicated by reference numeral 635. For example, if the user chooses the avatar representing the sender, the avatar in the avatar image corresponding to the sender may be displayed as waving its hand while standing.

In short, once the new message is read by the user, the posture of the avatar in the avatar image corresponding to the sender may be changed from a sitting posture to a standing posture. If there is more than one new message, the new messages may be displayed in the reverse order to which the new messages have been received.

Figure 11:
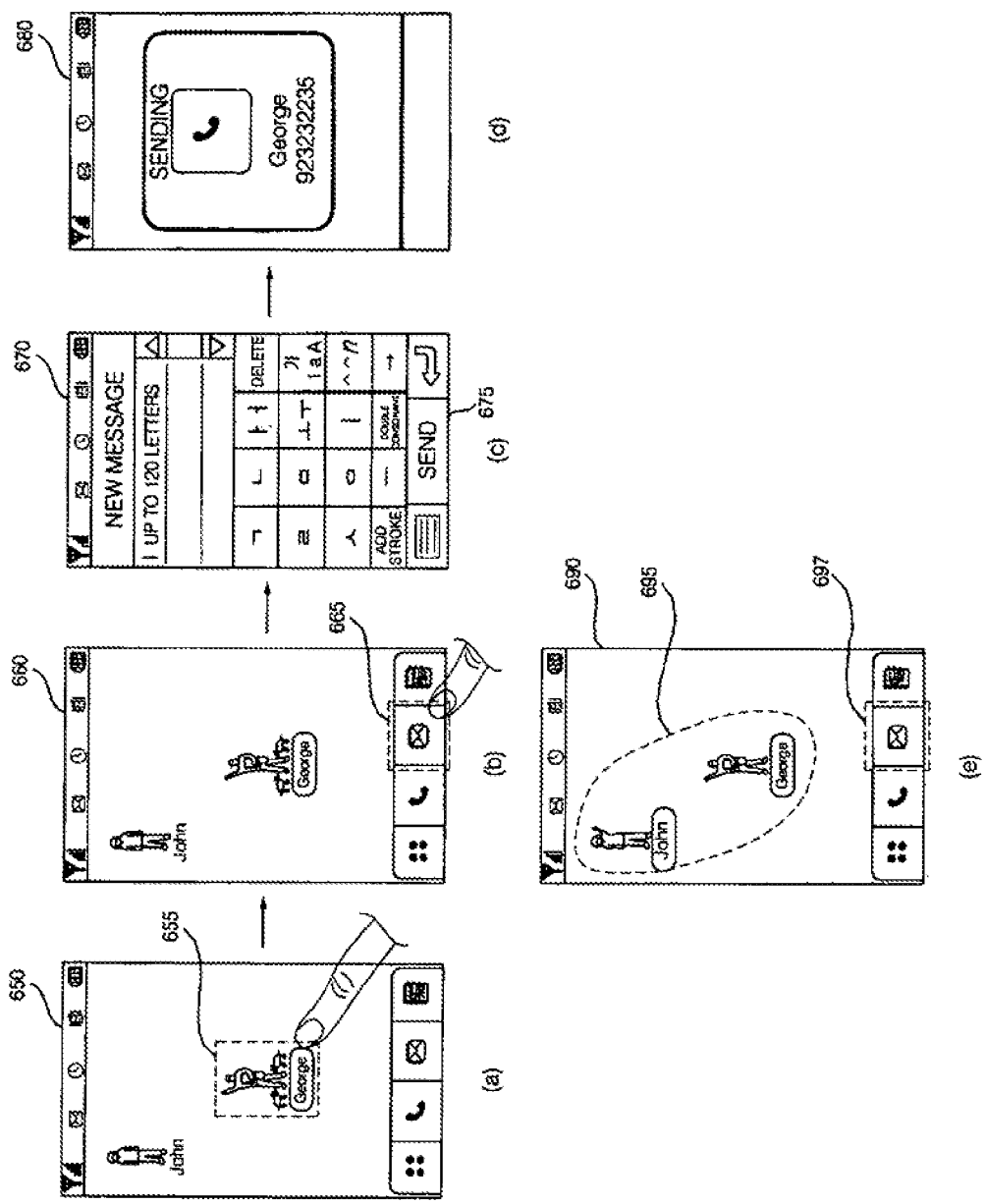

FIG. 11 illustrates diagrams for explaining how to send a message when an idle avatar screen is displayed. If a user touches and thus chooses an avatar image 665, as illustrated in FIG. 11(a), and then touches a message icon 605, as illustrated in FIG. 11(b), a message creation screen 670 may be displayed, as illustrated in FIG. 11(c). If the user finishes creating a message using the message screen 670 and touches an icon 'send' 675, a screen image 680 indicating that the message is being transmitted may be displayed, as illustrated in FIG. 11(d). FIG. 11(e) illustrates a diagram of a screen image 690 displayed when the user chooses more than one avatar image 695 and then touches a message icon 697 in order to send a message to more than one person.

Figure 12:
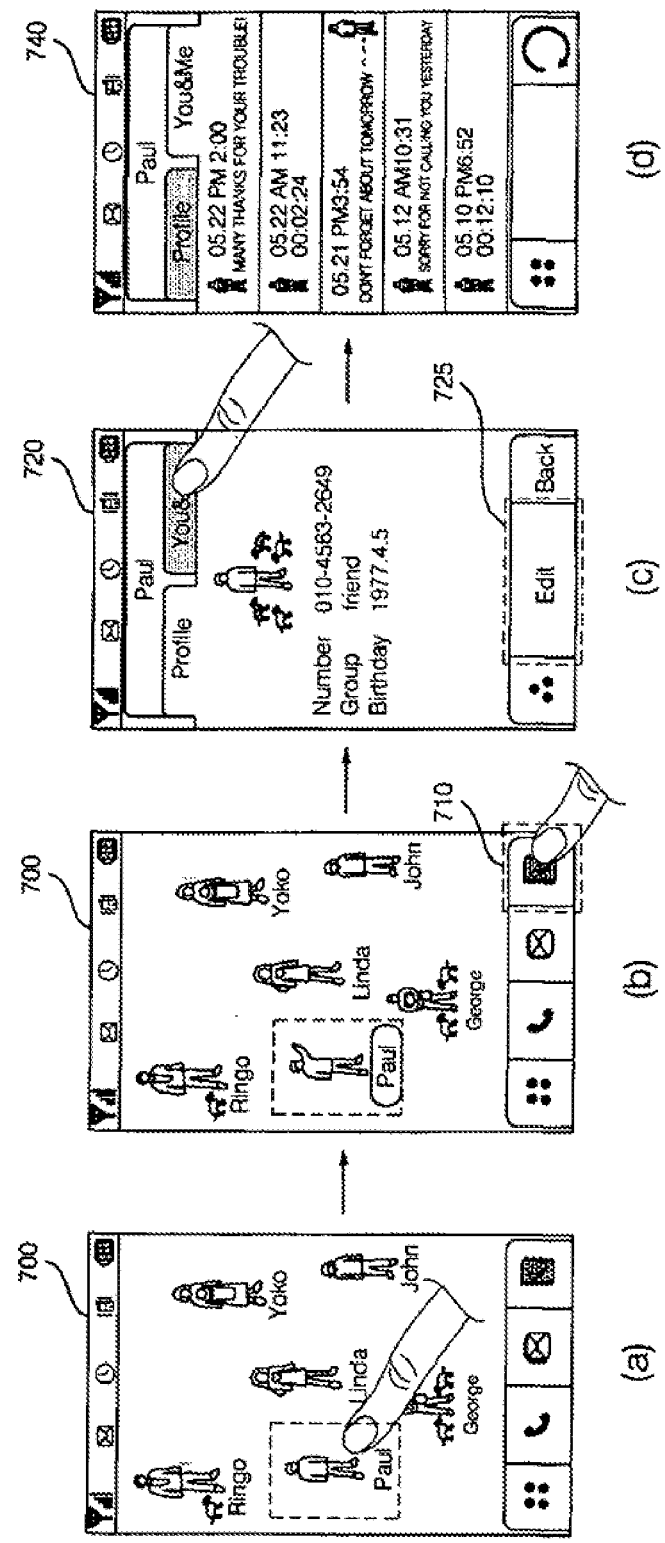

FIG. 12 illustrates diagrams for explaining how to use a phone book menu. If a user touches and thus chooses an avatar image 705, as illustrated in FIG. 12(a), and then touches a phone book icon 710, as illustrated in FIG. 12(b), profile information regarding a person corresponding to the avatar image 705 may be displayed, as illustrated in FIG. 12(c). Profile information regarding a person may be stored when the person's phone number is registered in a phone book. Thereafter, if the user chooses an icon 'Edit' 725 at the bottom of a screen image 720, the user may edit the profile information regarding the person corresponding to the avatar image 705.

Figure 13:
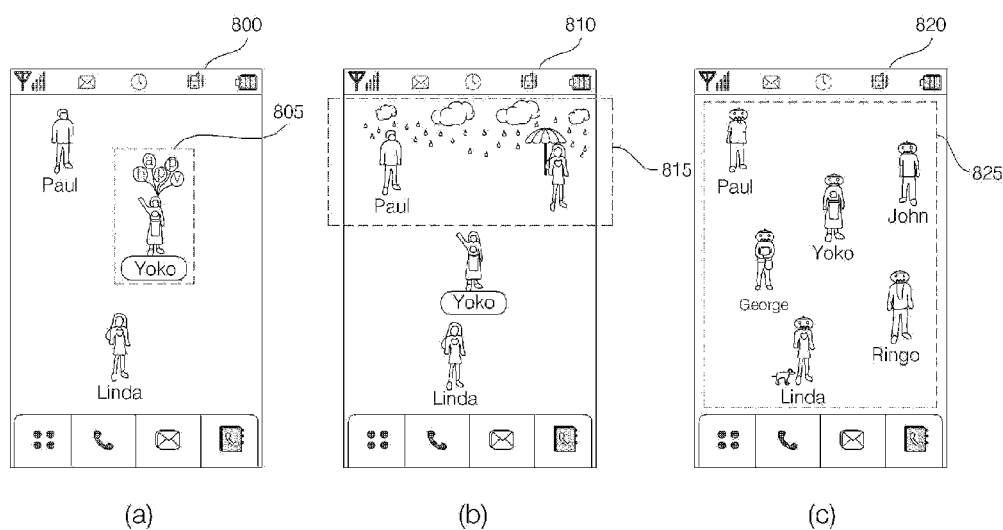

If the user chooses a tab 'You & Me', as illustrated in FIG. 12(c), the calls and/or messages exchanged between the user and the person corresponding to the avatar image 705 may be displayed, as illustrated in FIG. 12(d). The user may choose to display the calls and/or messages exchanged between the user and the person corresponding to the avatar image 705 as a list or a dialog by using an option menu. When the calls and/or messages exchanged between the user and the person corresponding to the avatar image 705 are displayed as a list, the avatar in the avatar image 705 may be displayed on the left so as to be able to be easily recognized, and an avatar representing the user may be displayed on the right. If one of the messages in the list is chosen, the content of the chosen message may be displayed. The user may scroll up or down the list. The calls and/or messages exchanged between the user and the person corresponding to the avatar image 705 may be displayed in various manners other than those set forth herein.
I FIG. 13 illustrates diagrams for explaining how to associate an avatar image with anniversary information or weather information. When a person's phone number is registered in a phone book, the person's birthday may also be registered in the phone book. Then, balloons 805 may be displayed along with an avatar representing the person on the person's birthday, as illustrated in FIG. 13(a).

FIG. 13(b) illustrates a diagram of a screen image 810 including avatar images associated with the weather. Referring to FIG. 13(b), if it rains, an avatar image including an avatar with an umbrella up may be displayed. On a windy day, an avatar image including an avatar and a tree shaken by the wind may be displayed or an avatar image including an avatar with hair blown by the wind may be displayed. On a fine day, an avatar image including an avatar and the shadow of the avatar may be displayed.

FIG. 13(c) illustrates a diagram of a screen image 820 including avatar images associated with an event day. For example, on Halloween, an avatar including avatars wearing a pumpkin mask may be displayed, as illustrated in FIG. 13(c). On Christmas, an avatar image including avatars in a snowy background or an avatar image including avatars wearing a Santa costume may be displayed.

An avatar may be displayed in an avatar image as performing various random actions such as inflating a balloon, feeding a dog, whistling or practicing gymnastics, thereby offering fun and excitement.

The mobile terminal according to the present invention and the method of controlling the operation of a mobile terminal according to the present invention are not restricted to the exemplary embodiments set forth herein. Therefore, variations and combinations of the exemplary embodiments set forth herein may fall within the scope of the present invention.

The present invention can be realized as computer-readable code written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

The mobile terminal may wirelessly communicate with other mobile terminals via one or more base stations and/or base control stations and/or gateways. Examples of such air interfaces utilized by the communication systems include frequency division multiple access (FDMA), time division multiple access (TDMA), code division multiple access (CDMA), and universal mobile telecommunications system (UMTS), the long term evolution (LTE) of the UMTS, and the global system for mobile communications (GSM).

For a software implementation, the embodiments described herein may be implemented with separate software modules, such as procedures and functions, each of which perform one or more of the functions and operations described herein. The software codes can be implemented with a software application written in any suitable programming language and may be stored in memory, and executed by a controller or processor.

As described above, according to the present invention, it is possible to display an avatar image in association with a communication event such as making/receiving a call or sending/receiving a message and to modify the avatar image according to the amount of occurrence of the communication event. Therefore, it is possible for a user to visibly recognize various information regarding the communication event from an idle screen and to easily make/receive a call or send/receive a message using the avatar image.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling an operation of a mobile terminal having a display screen, the method comprising:
   displaying a plurality of avatar images together on the display screen, wherein at least a first avatar image represents a first party registered in a phone book of the mobile terminal;
   detecting, via a controller of the mobile terminal, an occurrence of an incoming communication event associated with the first avatar image while the first avatar image is being displayed, the first avatar image having a first shape indicating a first action;
   in response to the occurrence of the communication event, changing the first shape of the first avatar image into a second shape indicating a second action of the first avatar image to inform a user of the mobile terminal about the detected occurrence of the communication event; and
   displaying an indicator representing a total number of occurrences of the communication event along with the first avatar image.

2. The method of claim 1, further comprising:
   changing the second shape of the first avatar image into the first shape of the first avatar image when the occurred communication event associated is selected by the user.

3. The method of claim 1, wherein the first avatar image is displayed in a different manner according to a total amount of occurrences of the communication event associated with the first avatar image.

4. The method of claim 1, further comprising:
   modifying a shape of the first avatar image indicating a predetermined date.

5. The method of claim 1, wherein the first avatar image is displayed on an idle screen.

6. The method of claim 1, further comprising:
   determining at least one avatar image having a different shape according to a type of a phone number group registered in the phone book of the mobile tei ininal.

7. The method of claim 1, further comprising:
   determining if a phone number of the party of the communication event is registered in the phone book of the mobile terminal; and
   displaying an avatar image representing the phone number registered in the phone book and a name registered in the phone book.

8. The method of claim 1, further comprising:
   determining if a phone number of the party of the communication event is not registered in the phone book of the mobile terminal; and
   displaying an avatar image including displaying the phone number of the party of the communication event and an avatar image indicating that the phone number of the party of the communication event is an unregistered phone number.

9. The method of claim 1, wherein the communication event comprises receiving a call or receiving a message.

10. The method of claim 1, further comprising:
    selecting one of the avatar images through one of a touch input or another input; and
    initiating a call to a party corresponding to the selected avatar image or sending a message to the party corresponding to the selected avatar image.

11. The method of claim 1, further comprising:
    selecting at least two avatar images through one of a touch input or another input; and
    simultaneously initiating a call or sending a message to the parties corresponding to the selected two avatar images.

12. The method of claim 1, wherein the first avatar image represents a human action.

13. The method of claim 1, further comprising:
    selecting one of the avatar images through one of a touch input or another input;
    entering a phone book mode associated with the selected avatar image; and
    editing profile information of a party corresponding to the selected avatar image in the phone book.

14. The method of claim 13, further comprising:
    displaying a history of the communication event having occurred between the user of the mobile terminal and the party corresponding to the selected avatar image.

15. The method of claim 1, further comprising:
    modifying the first avatar image based on weather information.

16. The method of claim 1, wherein the indicator comprises a number of objects corresponding to the total amount of occurrences of the communication event.

17. A mobile terminal, comprising:
    a wireless communication unit configured to wirelessly communicate with at least one other terminal;
    a display screen configured to display a plurality of avatar images together, wherein at least a first avatar image represents a first party registered in a phone book of the mobile terminal; and
    a controller configured to to:

detect an occurrence an incoming communication event associated with the first avatar image, the first avatar image having a first shape indicating a first action;

in response to the occurrence of the communication event, to change the first shape of the first avatar image into a second shape indicating a second action of the first avatar image to inform a user of the mobile terminal about the detected occurrence of the communication event; and display an indicator representing a total amount number of occurrences of the communication event along with the first avatar image.

18. The mobile terminal of claim 17, wherein the controller is further configured to change the second shape of the first avatar image into the first shape of the first avatar image when the occurred communication event associated is selected by the user.

19. The mobile terminal of claim 17, wherein the controller is further configured to display the first avatar image in a different manner according to a total amount of occurrences of the communication event associated with the first avatar image.

20. The mobile terminal of claim 17, wherein the controller is further configured to modify a shape of the first avatar image indicating a predetermined date.

* * * * *